United States Patent [19]
Yamawaki et al.

[11] Patent Number: 6,141,118
[45] Date of Patent: Oct. 31, 2000

[54] OPTICAL SCANNING DEVICE

[75] Inventors: Takeshi Yamawaki, Tokyo; Kazuyuki Kondo; Hiroshi Sato, both of Kawasaki; Kazumi Kimura, Toda, all of Japan

[73] Assignee: Canon Kabushiki Kaisha, Tokyo, Japan

[21] Appl. No.: 08/872,043

[22] Filed: Jun. 10, 1997

[30] Foreign Application Priority Data

Jun. 13, 1996 [JP] Japan ................................. 8-174332

[51] Int. Cl.[7] .................................................. H04N 1/40
[52] U.S. Cl. ............................................. 358/481; 358/480
[58] Field of Search .................................... 358/474, 475, 358/481, 482, 494; 359/204, 205, 206, 207

[56] References Cited

U.S. PATENT DOCUMENTS

| | | | |
|---|---|---|---|
| 3,955,048 | 5/1976 | Tanabe | 178/7.6 |
| 4,707,085 | 11/1987 | Takanashi et al. | 350/480 |
| 4,991,030 | 2/1991 | Sato et al. | 358/474 |
| 5,025,268 | 6/1991 | Arimoto et al. | 346/108 |
| 5,054,866 | 10/1991 | Tomita et al. | 359/206 |
| 5,245,462 | 9/1993 | Kanai et al. | 359/204 |
| 5,436,724 | 7/1995 | Ishizuka | 356/356 |
| 5,488,502 | 1/1996 | Saito | 359/205 |
| 5,566,006 | 10/1996 | Yoshinaga et al. | 358/475 |
| 5,646,767 | 7/1997 | Lima et al. | 359/206 |
| 5,701,190 | 12/1997 | Mochizuki et al. | 359/205 |
| 5,771,062 | 6/1998 | Nomura et al. | 347/257 |
| 5,982,539 | 11/1999 | Shirasaki | 359/484 |

FOREIGN PATENT DOCUMENTS

| | | |
|---|---|---|
| 0 585 867 | 3/1994 | European Pat. Off. . |
| 0 629 891 | 12/1994 | European Pat. Off. . |
| 0 697 782 | 2/1996 | European Pat. Off. . |
| 4425917 | 1/1995 | Germany . |

*Primary Examiner*—Jerome Grant, II
*Attorney, Agent, or Firm*—Fitzpatrick, Cella, Harper & Scinto

[57] ABSTRACT

An optical scanning device corrects a scanning line curvature and prevents image quality degradation, while spatially separating a plurality of light beams at oblique angles of incidence despite its compact magnifying optical scanning device construction. The optical scanning device directs, to the deflection surface of an optical deflector via a cylindrical lens, the plurality of light beams emitted by a light source having a plurality of light emission sections, guides, via an fθ lens system to a surface being scanned, the plurality of light beams deflected by the optical deflector so that the plurality of light beams scan the surface being scanned. The fθ lens system has a plurality of rotationally asymmetrical lenses, the optical axes of which are substantially parallel with the light beams incident on the respective lenses, and each of the generatrices that connect the vertices of a radius curvature on a lens surface in the sub scanning direction of the rotationally asymmetrical lenses is curved in a sub scan direction.

9 Claims, 17 Drawing Sheets

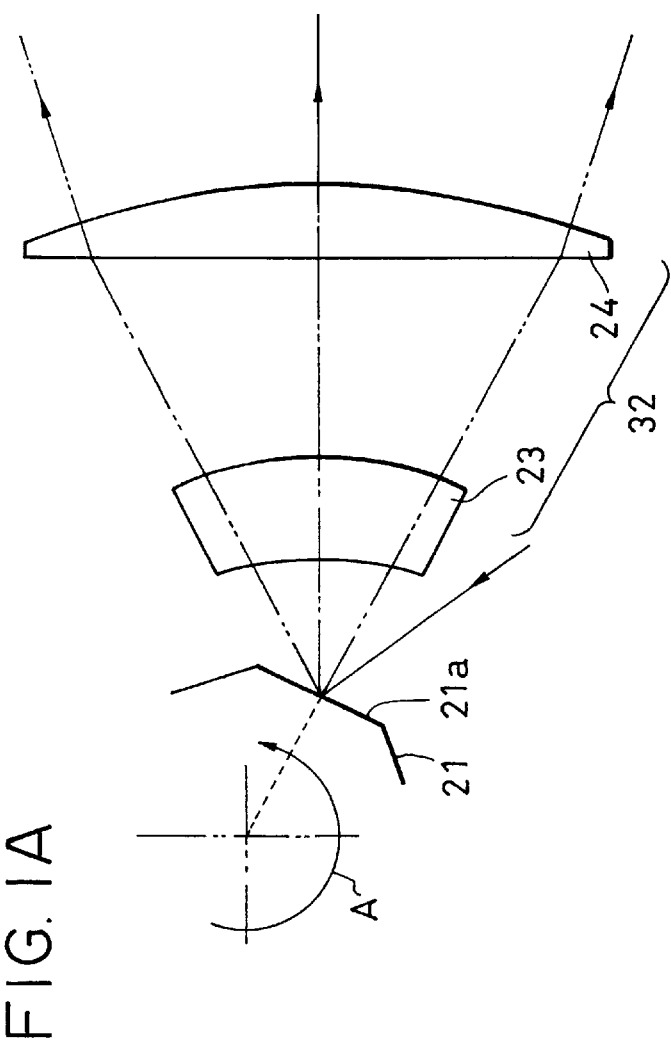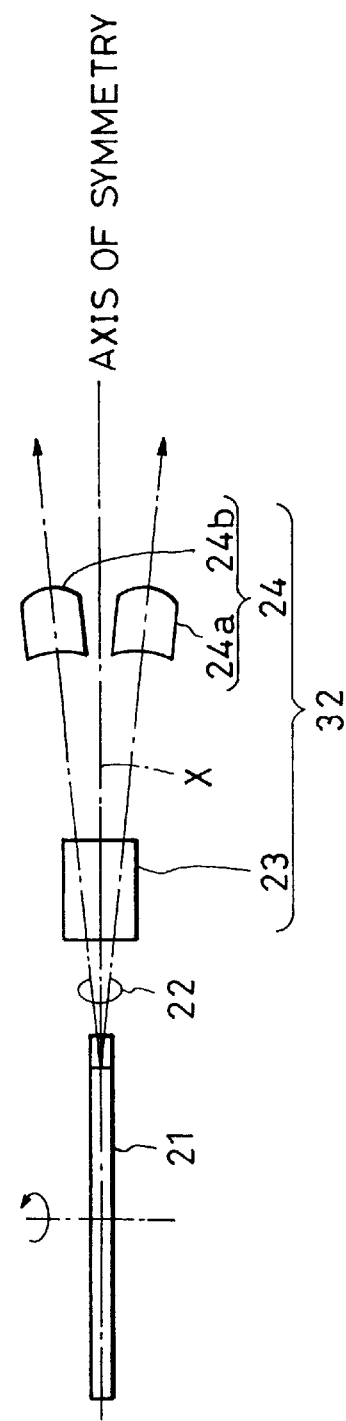
FIG. IA
FIG. IB

FIG. 2A  CURVATURE OF SCANNING LINE
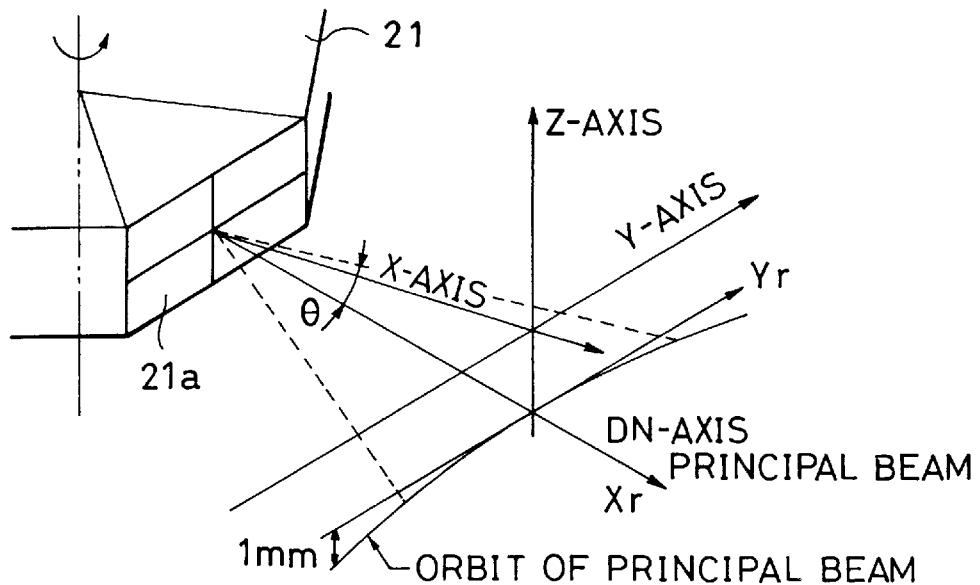
FIG. 2B  ROTATION OF BEAM
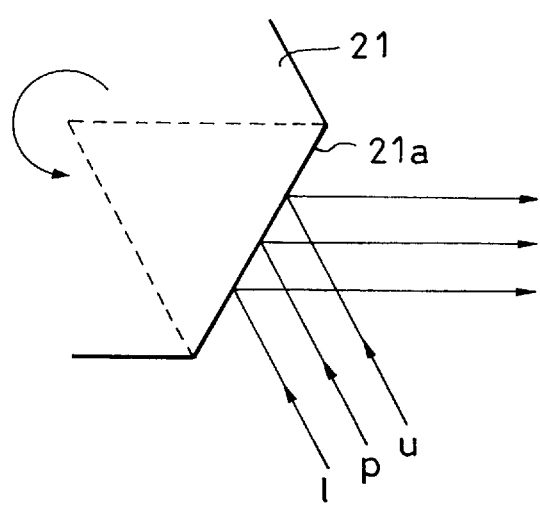
FIG. 2C
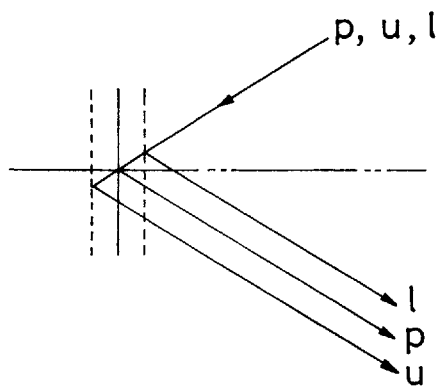
FIG. 2D
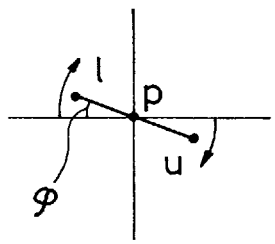

FIG. 3A
INCLINATION OF MERIDIONAL BEAM ON POLYGON MIRROR REFLECTION SURFACE
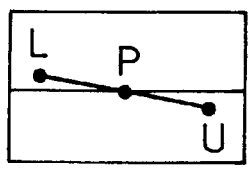 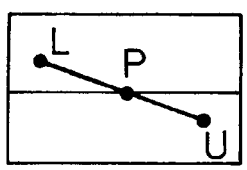 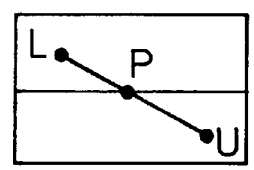
FIG. 3B
RELATIONSHIP OF PRINCIPAL BEAM ORBIT THROUGH SCAN TO MERIDIONAL UPPER/LOWER BEAM
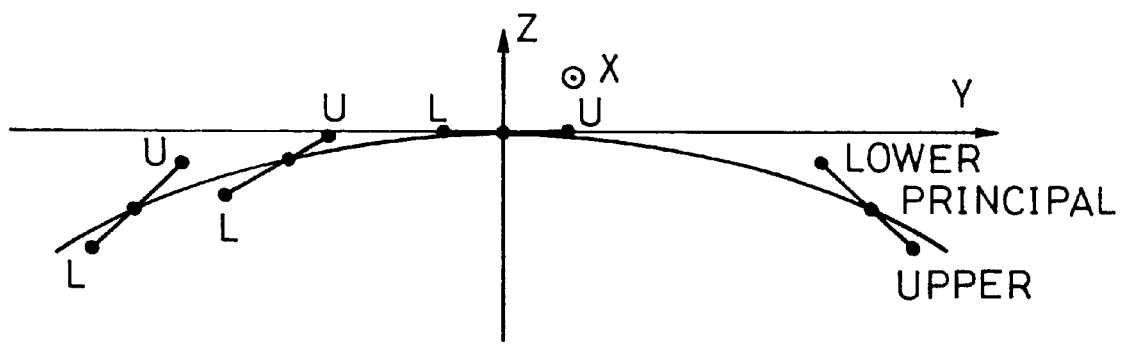

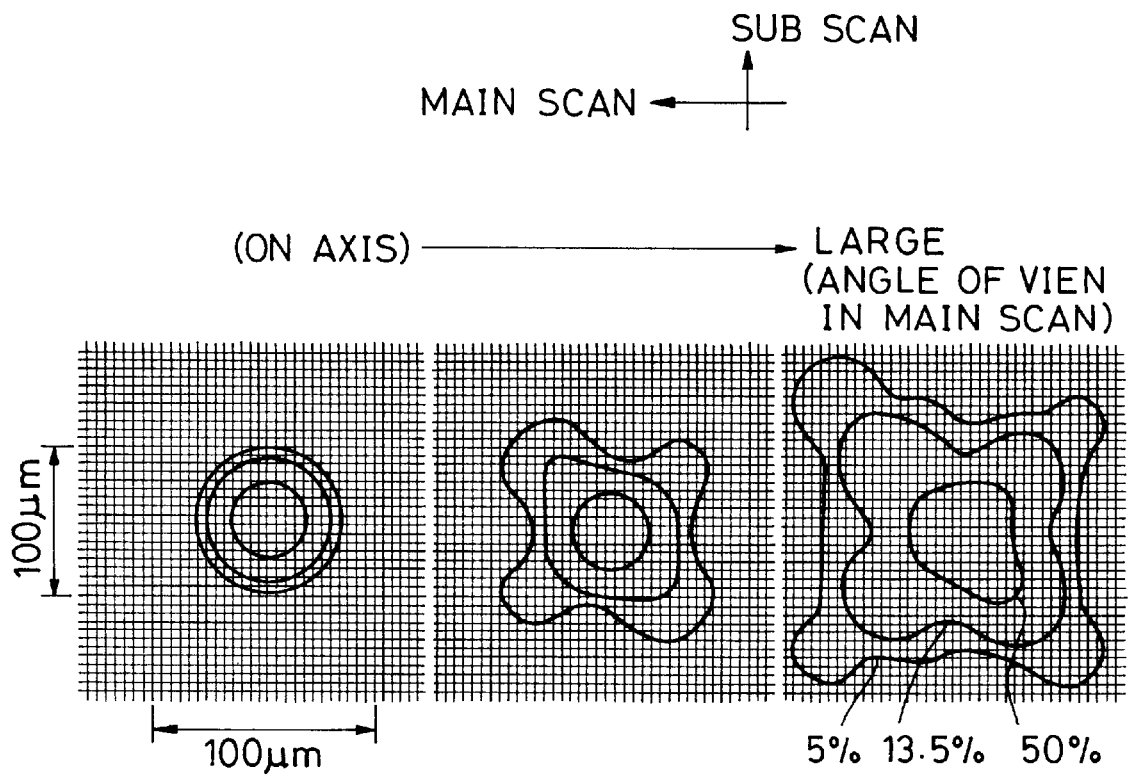

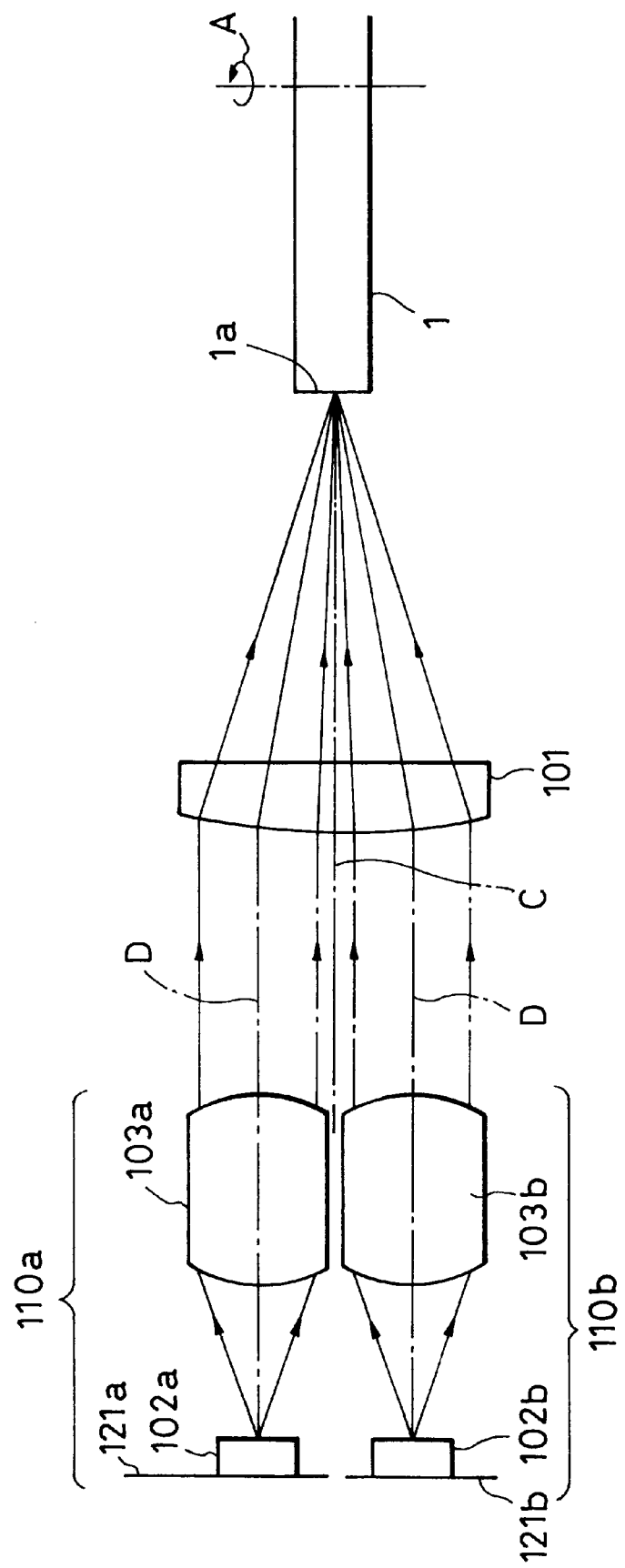

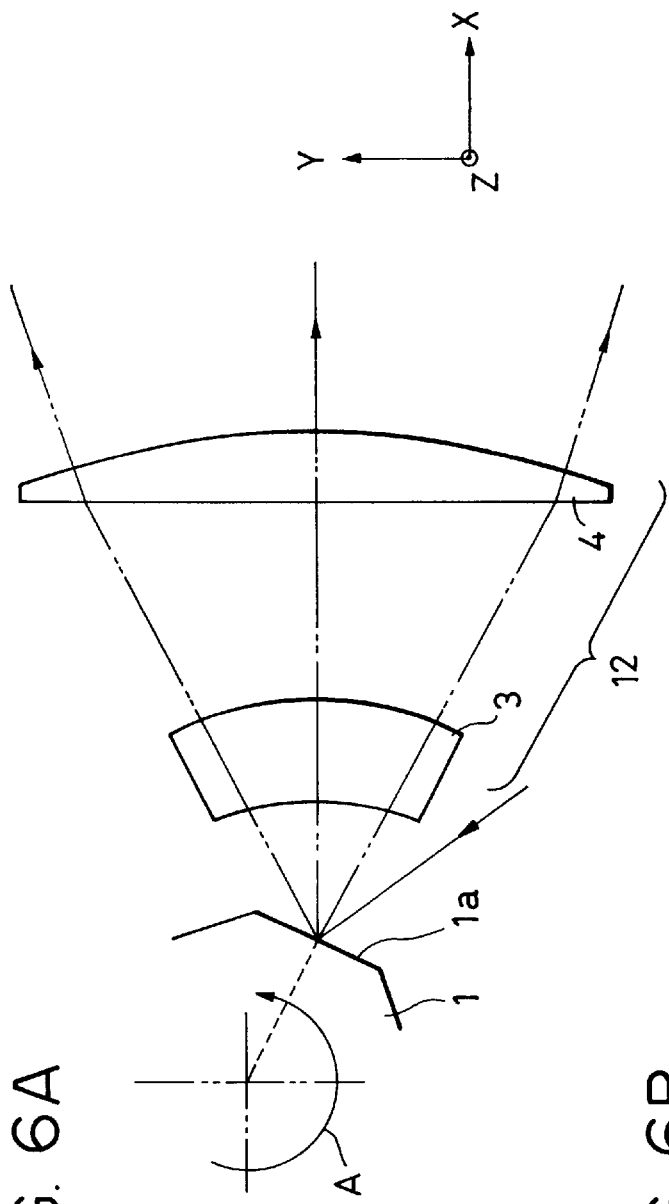
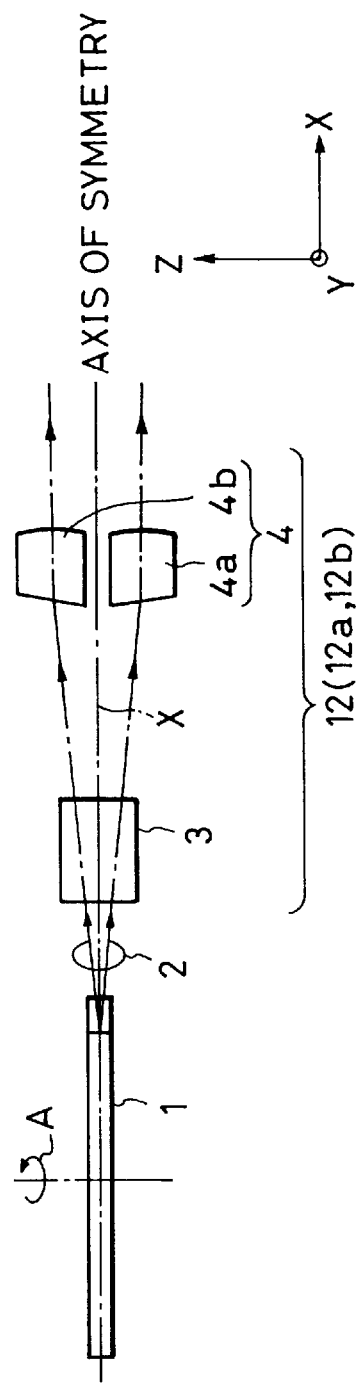
FIG. 6A
FIG. 6B

R2 SURFACE, GENERATRIX IN Y-Z CROSS SECTION

R1 SURFACE, GENERATRIX IN Y-Z CROSS SECTION

PRINCIPLE OF IMAGE
QUALITY IMPROVEMENT

SPECIAL TORIC SURFACE
WITH CURVED GENERATRIX

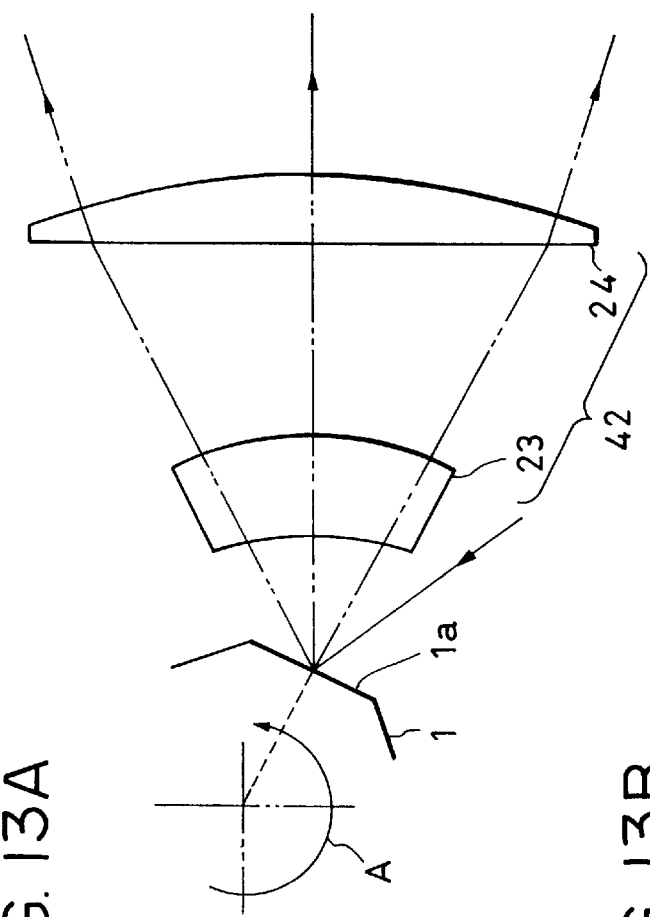
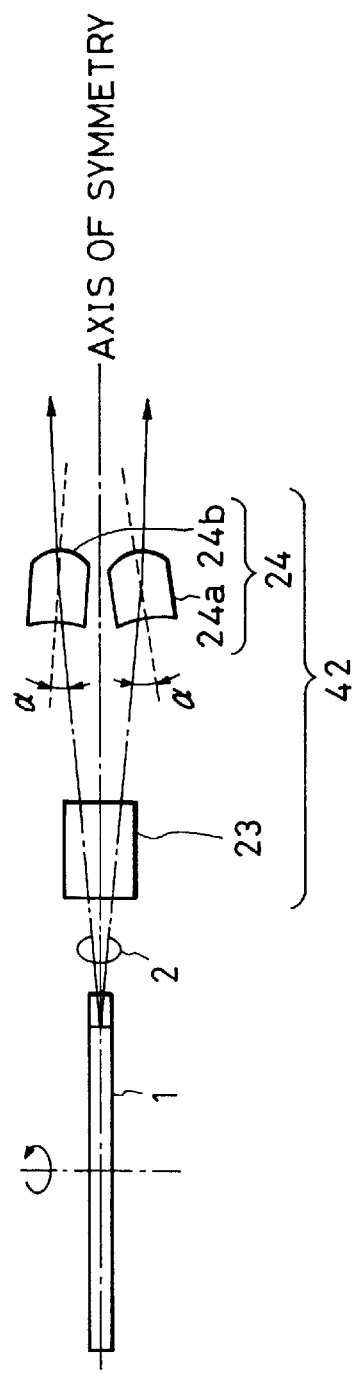
FIG. 13A
FIG. 13B

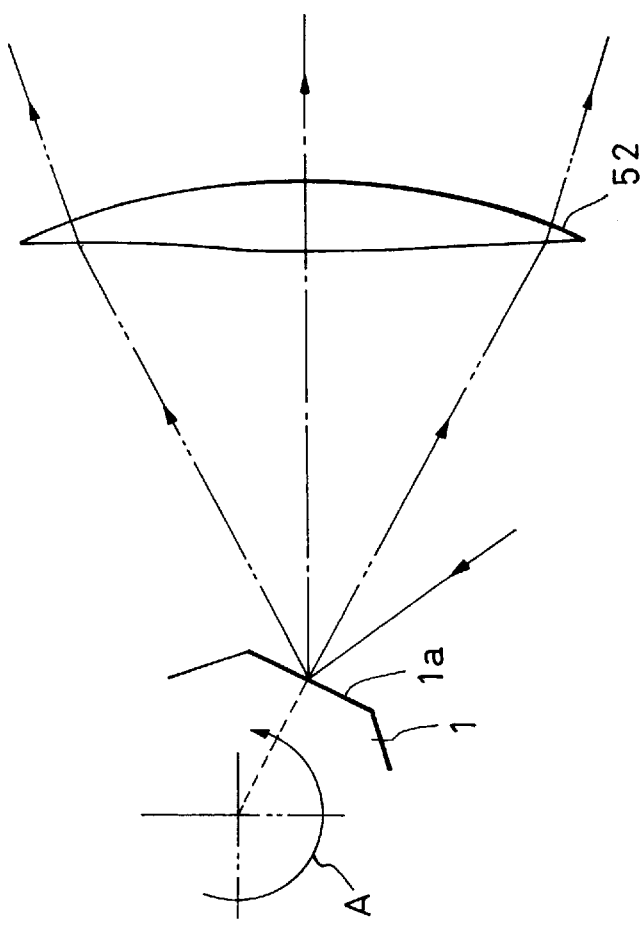
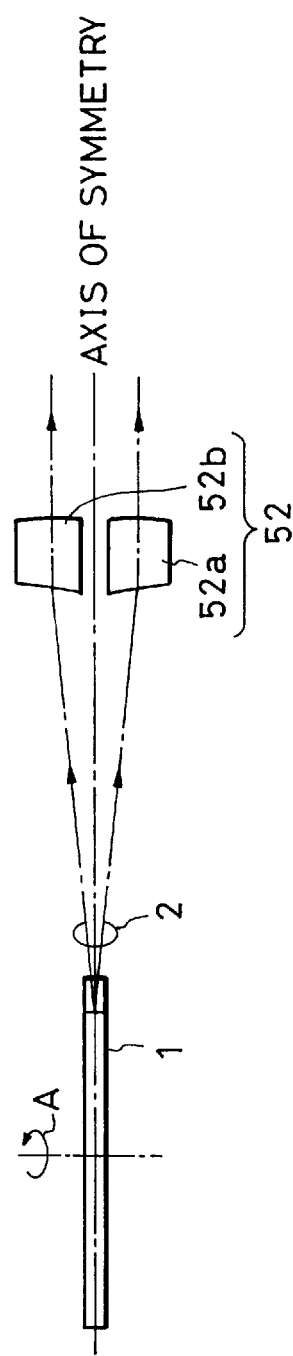
FIG. 15A
FIG. 15B

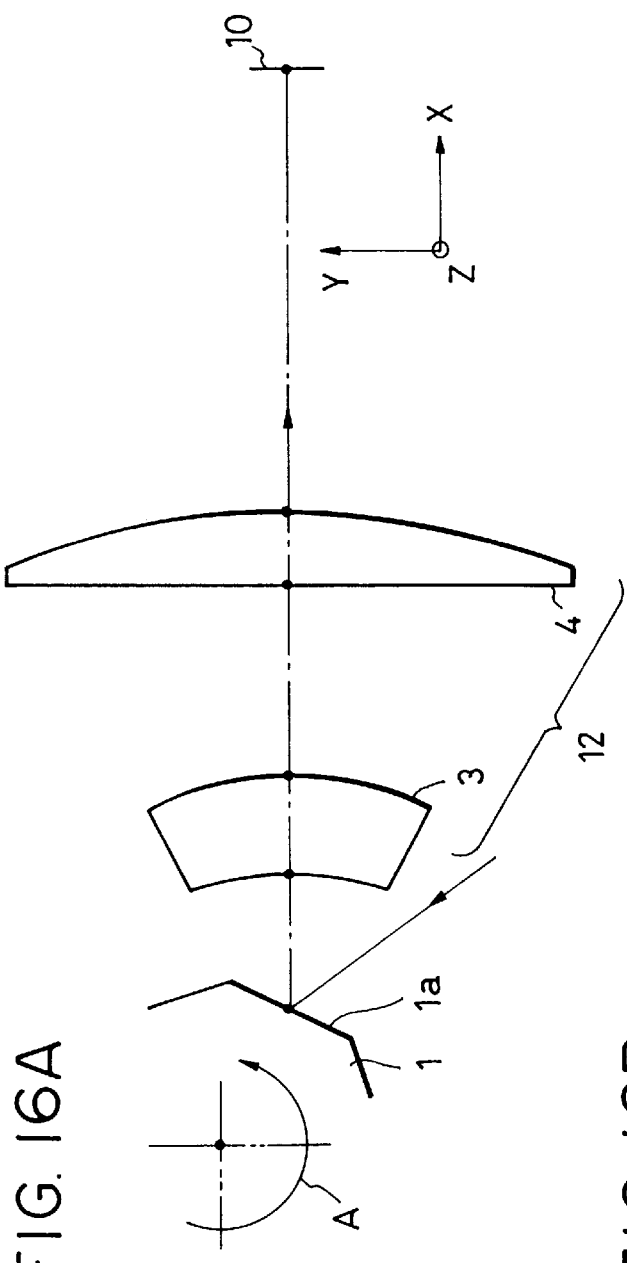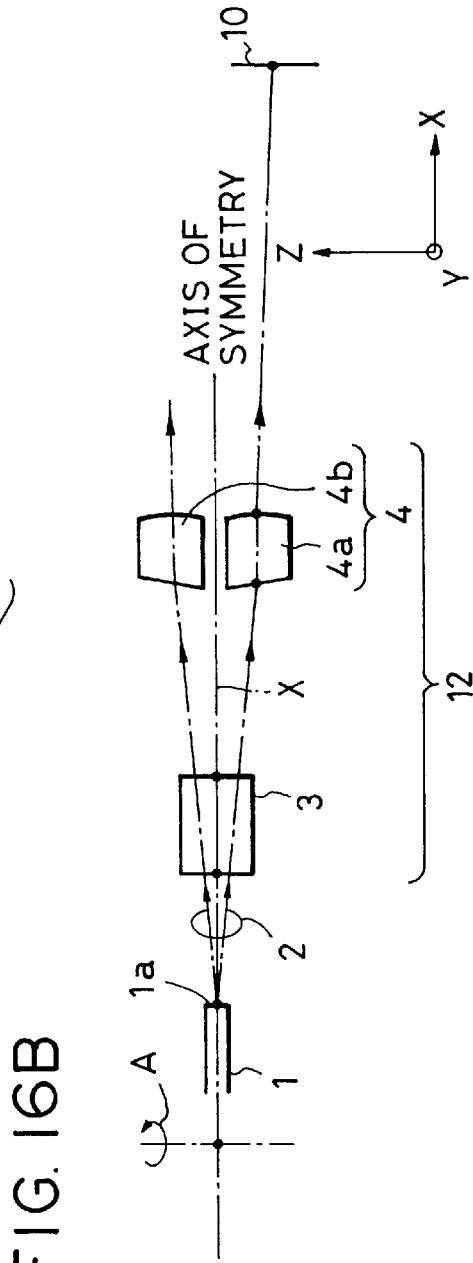
FIG. 16A
FIG. 16B

OPTICAL SCANNING DEVICE

BACKGROUND OF THE INVENTION

1. Field of the Invention

The present invention relates to an optical scanning device and, more particularly, to an optical scanning device for use in a laser-beam printer in which light beams emitted from a plurality of light sources are directed to a deflection surface of deflection means at a predetermined angle thereto in a sub scan longitudinal section and a plurality of beams reflected and thus deflected by the deflection means are used to optically scan a recording medium (a photoconductor drum) and to record image information.

2. Description of the Related Art

A variety of multi-beam optical scanning devices have been proposed which present a multi-color recording by introducing a plurality of light beams to a common scanning optical system. In such a type of multi-beam optical scanning device, to independently project a plurality of light beams to a surface being scanned, the light beams need to be reflected and thus deflected by an optical deflector (a polygon mirror, for example) and then need to be split. To this end, however, spatial separation is required for the same wavelength light sources. For example, spatial separation is made possible by introducing the light beams to the deflection surface (reflection surface) of the optical deflector at an oblique angle in a sub scan longitudinal section.

In a magnifying optical scanning device with its optical system under the pressure of compact size demand, the optical path for spatial separation permitted is short, and an angle of incidence to the deflection surface becomes large, thereby presenting the following two major problems.

A first problem is the scanning line curvature on a surface being scanned, and a second problem is image quality degradation. These problems will now be discussed with reference to the optical system shown in FIGS. 1A and 1B.

FIGS. 1A and 1B are sectional views of a major portion of the optical system of a conventional magnifying optical scanning device, in which light beams are obliquely introduced. FIG. 1A is a sectional view of a main scan and FIG. 1B is a sectional view of a sub scan perpendicular to FIG. 1A. As shown, two light beams obliquely incident on the deflection surface of an optical deflector 21 are reflected and deflected.

The optical deflector 21 is a polygon mirror, for example. Two obliquely incident light beams 22 are reflected and deflected by the polygon mirror. Image forming means 32 comprises two-element fθ lens system having a cylindrical lens 23 with a predetermined refracting power in a main scan plane or a longitudinal section and two-stacked toric lenses 24. The cylindrical lens 23 gets the lens backward space of the fθ lens system 32, contributing to shifting the entire lens system closer to the polygon mirror 21 and thus making the optical system compact. As shown in FIG. 1B, the two-stacked toric lenses 24 comprise, in the direction of the sub scan, upper and lower toric lenses 24a, 24b, which are independently arranged in the respective optical axes of the two obliquely incident light beams 22.

The operation of a light incident system for introducing two light beams at an oblique angle to the optical deflector 21, though not shown, is as follows: a plurality of light beams emitted from a plurality of light sources and corresponding to the two obliquely incident light beams 22 are collimated into parallel light beams through a collimator lens, and are then brought to a focus as a line in the vicinity of the deflection surface 21a of the polygon mirror 21 through a cylindrical lens that has a predetermined refracting power in the sub scan longitudinal section only. This serves as means for correcting the tilt of the deflection surface of the polygon mirror in the sub scan longitudinal section or plane, making the deflection surface of the polygon mirror optically conjugate to a surface being scanned (the surface of a photoconductor drum) with respect to the sub scan longitudinal section, and namely, constitutes a tilt correction optical system.

The plurality of light beams 22 (obliquely incident beams) reflected from the mirror 21 are guided to predetermined positions on the photoconductor drum through unshown optical path bending mirrors by the fθ lens system 32. With the polygon mirror 21 rotating, the scanning lines are drawn in the direction of the main scan in which the light beams are deflected while the photoconductor drum rotates in synchronization with the polygon mirror 21 so that the scanning lines are formed at regular intervals in the sub scan direction perpendicular to the main scan direction. In this way, by simultaneously projecting two light beams onto the photoconductor drum, two-color development is made possible during a single revolution of the photoconductor drum, expediting color printing.

The oblique incidence of light has been conventionally unused in the magnifying optical system, because the following problem arises when the light beams are obliquely directed to the deflection surface 21a of the polygon mirror 21 in the sub scan longitudinal section.

The problem of the oblique incidence of light is discussed referring to the light beam (obliquely incident light rays) reflected downward with respect to the axis of symmetry X of the toric lenses 24a, 24b shown in FIG. 1B.

The first problem occurs when the light beam obliquely incident on the deflection surface 21a of the polygon mirror 21 scans along a conical surface as shown in FIG. 2A in the sub scan longitudinal section (a plane perpendicular to X-Y plane). The light beam deviated as above enters the toric lens 24a arranged in the optical axis of the obliquely incident light beam 22, and then draws a scanning line curved due to such deviation on the surface of the photoconductor drum as the surface being scanned. This is the scanning curvature problem of the oblique angle of incidence. In the magnifying optical system, the obliquely incident angle Q needs to be as large as 3° through 6°, and this translates to the amount of curvature of the scanning line in the range of 0.5 mm to several mm on the photoconductor drum, which is sufficiently large.

A solution to this problem is a plane-parallel glass plate (a correction glass) arranged in the optical axis. However, this correction arrangement needs a thick glass plate making the apparatus bulky and pushing the cost of the apparatus.

The second problem is the image quality degradation. FIGS. 2B, 2C and 2D illustrate how the image quality degrades. FIG. 2B is an explanatory view of light beams incident on the deflection surface 21a of the polygon mirror 21 in the plane of the main scan. As shown, P is a principal beam and U and L are light beams on both sides of the principal beam P. FIG. 2C shows the sub scan longitudinal section or sub scan plane of FIG. 2B.

As shown, light beams L, P and U are reflected as light beams having different heights in that order in view of the sub scan plane. Since the light beams are brought to a focus as a line image in the sub scan direction by the incident tilt correction cylindrical lens (not shown), the light beams L, P, and U are expressed as a rotated line image having an angle of rotation of φ relative to the main scan plane (X-Y plane) on the deflection surface of the polygon mirror as shown in FIG. 2D. The angle of rotation of φ varies in proportion to the angle of rotation of the polygon mirror.

FIG. 3A is an explanatory view showing the inclination of the light beams in the sub scan longitudinal section on the deflection surface of the polygon mirror, and FIG. 3B is an explanatory view showing the orbit of the principal light beam P which is caused to scan by the polygon mirror and the light beams U and L on both sides of the principal light beam P. Meridional beams are the ones, referenced to the X-Y plane, defined by the entrance optical system for projecting the incident beams onto the polygon mirror.

As shown in FIGS. 3A and 3B, as the angle of view in the main scan plane (an absolute value of the Y coordinate) increases, the angles of rotation φ of light beams L, P and U increase. The light beams L and U rotate about the principal beam P in the Y-Z plane, and are affected by refracting power in the meridional direction of the toric lens 24a. Thus, the image quality degrades.

FIG. 4 illustrates how the image quality degrades as the angle of rotation of φ of the light beam increases with an increase of the angle of view of main scan. A spot image is increasingly distorted to a star-like configuration as the main scan angle of view increases.

SUMMARY OF THE INVENTION

It is an object of the present invention to provide an optical scanning device which, by constructing the shape of and arranging the position of a toric lens that is a rotationally asymmetric lens constituting image forming means (fθ lens), corrects appropriately the curvature of a scanning line while preventing the degradation of image quality, and spatially separates a plurality of light beams that are introduced by the compact magnifying optical scanning device at an obliquely incident angle.

The optical scanning device of the present invention projects, to a deflection surface of deflection means via optical means, a plurality of light beams emitted by light source means having a plurality of light emission sections, and guides to a surface being scanned, via image forming means, the plurality of light beams deflected by the deflection means to cause the plurality of beams to scan the surface being scanned, and the image forming means comprises a plurality of rotationally asymmetrical lenses, wherein the optical axes of the plurality of rotationally asymmetrical lenses are substantially parallel with the light beams incident on the respective lenses and the configurations of a generatrices connecting the vertices of a radius curvature on a lens surface in the sub scanning direction of the rotationally asymmetrical lenses are curved in the sub scan direction.

The plurality of light beams are directed to the deflection surface of the deflection means at angles symmetrically aligned about the optical axis of the optical means in the sub scan plane, the configurations of the generatrices of the plurality of rotationally asymmetrical lenses are bilaterally symmetrical about an axis of symmetry, the generatrices of the lens surfaces of the plurality of rotationally asymmetrical lenses are shifted from the optical axes of at least either of the lens surfaces in the sub scan direction, and the deflection surface of the deflection means is optically conjugate to the surface being scanned with respect to the image forming means.

BRIEF DESCRIPTION OF THE DRAWINGS

FIGS. 1A and 1B are sectional views of a major portion of an optical system of a conventional optical scanning system;

FIGS. 2A through 2D illustrate the problems of an obliquely incident light beam;

FIGS. 3A and 3B illustrate the problems of the oblique incidence of light beam;

FIG. 4 illustrates the problem of the oblique incidence of light beam;

FIGS. 5A through 5C illustrate the major portion of a first embodiment of an optical scanning device of the present invention;

FIGS. 6A and 6B are sectional views showing the major portion of the first embodiment of the optical scanning device of the present invention;

FIGS. 13A and 13B are sectional views illustrating a major portion of a second embodiment of the present invention;

FIGS. 15A and 15B are sectional views illustrating the major portion of the third embodiment of the present invention; and FIGS. 16A and 16B are sectional views illustrating the optical layout of the optical scanning device shown in FIG. 5.

DESCRIPTION OF THE PREFERRED EMBODIMENTS

Figure 5A:
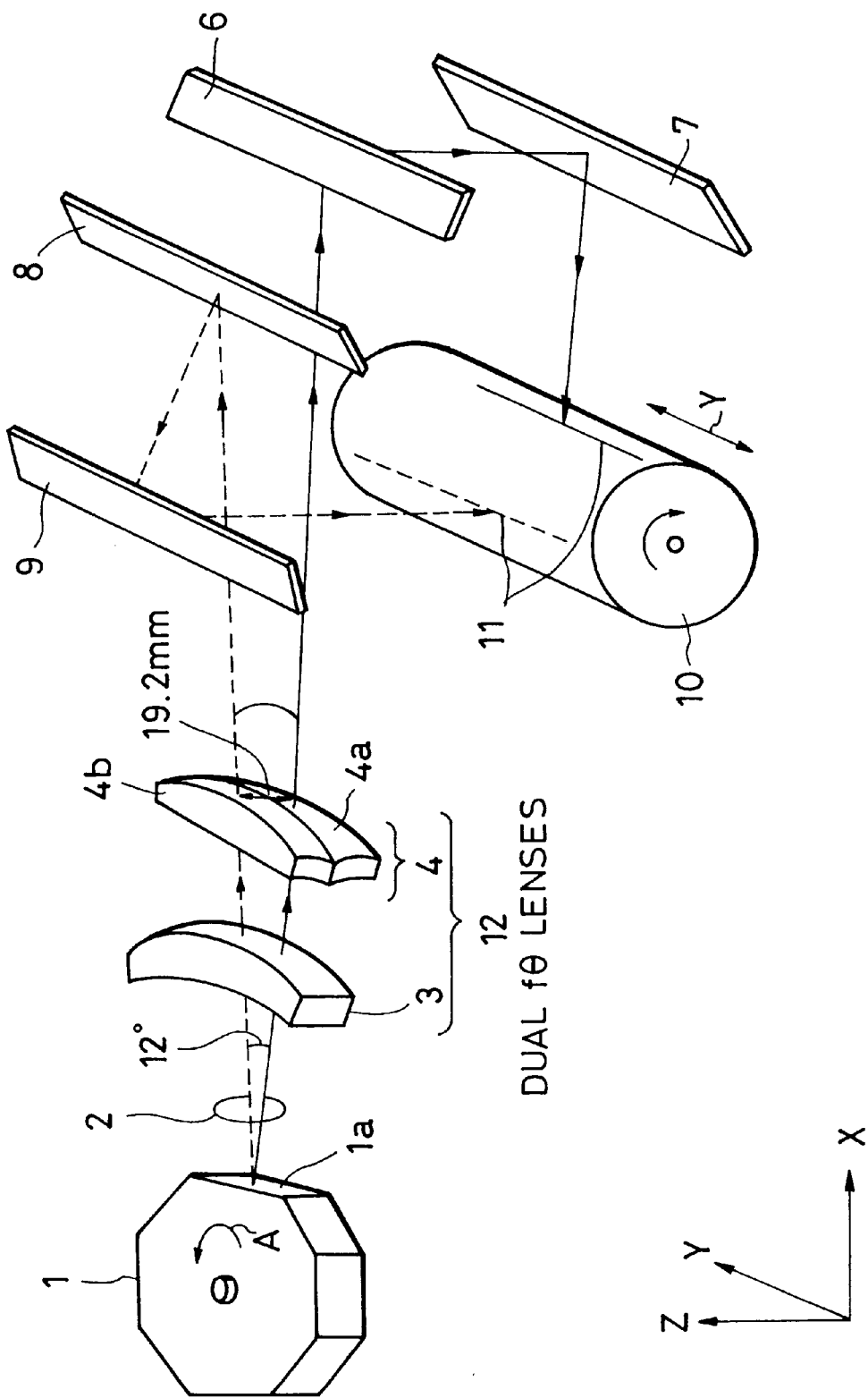
Figure 5C:
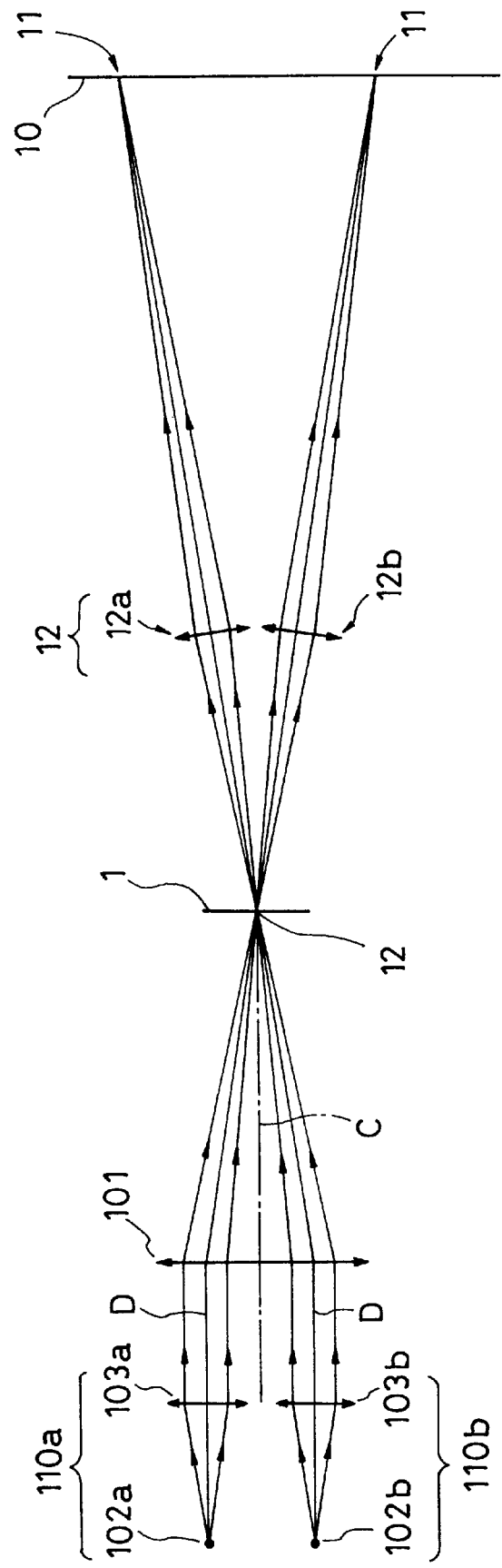

FIG. 5A is a perspective view of a major portion of an optical scanning device, including an optical deflector and its succeeding stages, for use in a laser printer according to a first embodiment of the present invention. FIG. 5B is a sectional view showing a sub scan plane, in which the axis of rotation of the optical deflector and an optical axis C lie, in the optical scanning device (including an optical deflector and its preceding stages) of the first embodiment of the present invention. FIG. 5C is a sectional view showing distribution of refracting power in the sub scan plane or sub scan longitudinal section in the optical scanning device according to the first embodiment of the present invention.

In FIGS. 5B and 5C, collimating laser beam source 110a (110b) comprises a laser emitter (a laser chip) 102a (102b) of semiconductor laser, and a collimator lens 103a (103b) that is arranged correspondingly to the laser emitter 102a (102b). In this embodiment, the laser emitters 102a, 102b are mounted on different substrates 121a, 121b, respectively. The collimator lens 103a (103b) collimates laser light rays (laser beams) emitted from the laser emitter 102a (102b) into substantially parallel laser beams, which are directed to an oblique entrance optical system 101 in parallel with the optical axis C.

The oblique entrance optical system 101 is constructed of a cylindrical lens as an optical element having a positive refracting power in the sub scan direction only, and its optical axis C stays shifted from but in parallel with (decentered from) the optical axes D of the two collimating laser beam sources 110a, 110b. In this embodiment, a plurality of laser beams emitted from the two collimating laser beam sources 110a, 110b are directed to the deflection surface of the optical deflector at substantially equal angles of incidence in a symmetrical fashion in the sub scan longitudinal section, and are then subjected to spatial separation to split light paths. The optical deflector 1 is a polygon mirror, for example, and is mounted so that its deflection surface (reflection surface) is placed in the vicinity of the convergence point 9 where the plurality of laser beams are converged by the oblique entrance optical system 101. The optical deflector 1 is rotated at a constant speed by driving means (not shown) such as a motor in the direction of an arrow A.

As shown in FIG. 5C, image forming means 12 includes two fθ lenses 12a, 12b (an image forming optical system) having f-θ characteristics, and two fθ lenses 12a, 12b are arranged correspondingly to laser beams emitted from the two laser beam sources 102a, 102b. The image information bearing laser beams deflected by the optical deflector 1 are focused on separate positions on the surface of a photoconductor drum 10 as a surface being scanned (a recording medium surface).

In this embodiment, the laser beams emitted from the two laser emitters 102a, 102b are collimated into substantially parallel laser beams through the collimator lenses 103a, 103b respectively corresponding to the laser emitters 102a, 102b, and are then directed to the cylindrical lens 101. The parallel laser beams introduced to the cylindrical lens 101 are delivered in parallel laser beams, as they are, in the main scan longitudinal section. In the sub scan longitudinal section, however, the parallel laser beams are focused as a line image in the vicinity of the deflection surface (reflection surface) 1a of the optical deflector 1. In this case, two laser beams are obliquely introduced to the deflection surface 1a at substantially equal angles of incidence, symmetrically relative to the optical axis C. Two laser beams deflected by the deflection surface 1a of the optical deflector 1 are simultaneously focused at the different positions on the surface 10 being scanned via the respective fθ lenses 12a, 12b. By rotating the optical deflector 1 in the direction of the arrow A, the laser beams scan the surface 10 being scanned in the main scan direction to record image information.

FIGS. 6A and 6B are respectively, a main scan section and a sub scan section of the major portion of the optical deflector of the optical scanning device according to the first embodiment of the present invention. As shown in FIGS. 5A, 5B, 5C, 6A, and 6B, two laser beams (light beams) are introduced at angles of incidence of approximately 6° symmetrically relative to the optical axis C of the oblique entrance optical system 1 perpendicular to the deflection surface 1a of the optical deflector and are then reflected. Thus, the two laser beams are delivered from the polygon mirror at an angle of difference of 12° therebetween.

The optical deflector 1 functions as deflection means. The optical deflector 1 is typically a polygon mirror, and is rotated at a predetermined speed in the direction of the arrow A by a motor (not shown) as driving means. Designated 2 are two obliquely incident light beams 2 that are reflected and deflected by the polygon mirror, at the same height in the sub scan direction on the deflection surface 1a of the polygon mirror 1. An fθ lens system 12 as image forming means is a two-element system including a cylindrical lens 3 as a first lens and two-stacked toric lenses 4 as second lenses having a lens configuration to be described later. The fθ lens system 12 focuses the plurality of beams reflected and deflected by the polygon mirror 1 at different positions of exposure on the surface of the photoconductor drum 10. The fθ lens system 12 is functionally constructed of fθ lens 12a made up of the cylindrical lens 3 and the toric lens 4b, and fθ lens 12b made up of the cylindrical lens 3 and the toric lens 4a.

In this embodiment, the two-stacked toric lenses 4 are constructed of upper and lower toric lenses (rotationally asymmetrical, second lenses) 4a, 4b in the sub scan plane as shown in FIG. 6B, and the two obliquely incident light beams 2 are independently directed to the respective toric lenses 4a, 4b and the spacing between the two beams on the exit surfaces of the toric lenses is 19.2 mm. In this embodiment, optical path bending mirror (splitting mirrors) 6, 8 to be described later are arranged without any mutual interference in the sub scan plane. The optical axes of the toric lenses 4a, 4b are substantially parallel with the incident beams, and the shapes of the generatrices that connect the vertices of the radius curvature on a lens surface in the sub scanning direction of the toric lens are curved in the sub scan direction.

Since the cylindrical lens 3 has no refracting power in the sub scan longitudinal section or sub scan plane, only the two-stacked toric lenses 4 contribute to image formation in the sub scan. Optical path bending mirrors 6, 7, 8 and 9 are the ones for bending the optical paths, and guide the respective beams to the different positions of exposure on the surface of the photoconductor drum 10 as the recording medium. Designated 11 are scanning lines on the photoconductor drum 10.

The entrance optical system, although not shown, operates as follows: a plurality of light beams respectively emitted from a plurality of light sources 102a, 102b (semiconductor lasers, for example) are collimated through collimator lenses 103a, 103b into parallel light beams, and are then introduced to a cylindrical lens 101 (a first rotationally asymmetrical lens) having a predetermined refracting power in the sub scan plane and then brought to a focus as a line image in the vicinity of the deflection surface 1a of the polygon mirror 1. This arrangement is ordinary means used to correct the tilt of the deflection surface of the polygon mirror in the sub scan direction. In the sub scan longitudinal section, the fθ lens system makes the deflection surface 1a of the polygon mirror 1 optically conjugate to the surface of the photoconductor drum. Specifically, the above arrangement constitutes a tilt correction optical system. Each of the collimator lens and the cylindrical lens in the entrance optical system constitutes one element of the optical means.

The plurality of light beams reflected and deflected by the polygon mirror 1 are guided through the fθ lenses and respective optical bending mirrors 6, 7, 8 and 9 to positions of exposure on the surface of the photoconductor drum 10. As the polygon mirror 1 rotates, each scanning line 11 is drawn along the direction of the axis of the drum (in the direction of the main scan), while the photoconductor drum 10 rotates in synchronization with the polygon mirror 1 so that the scanning lines 11 are formed at regular intervals in the sub scan direction perpendicular to the main scan direction. In this way, two scanning lines 11 are drawn on the photoconductor drum independently but simultaneously, permitting two-color development during a single revolution of the photoconductor drum, and consequently achieving a fast color printing.

Figure 7B:
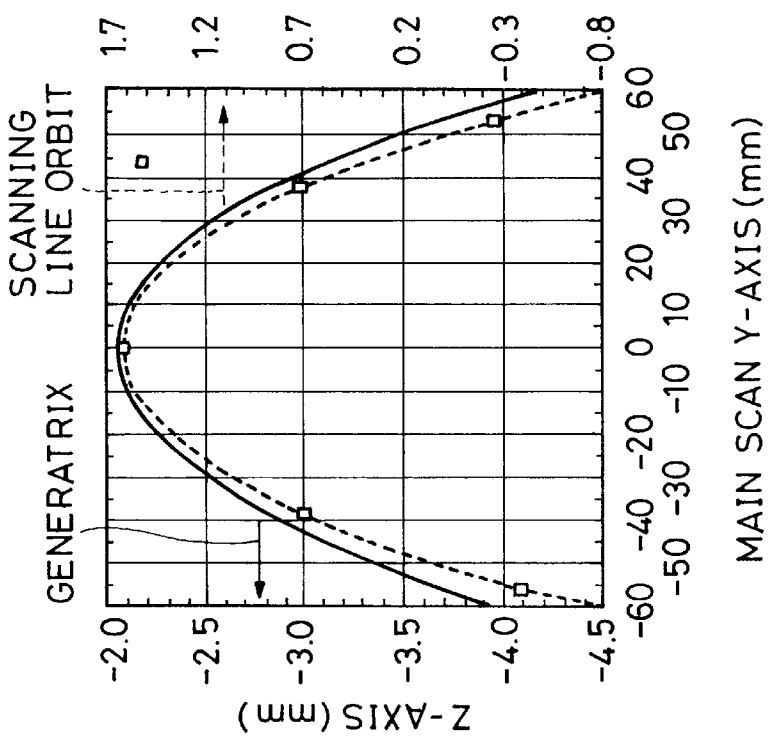
FIGS. 7A and 7B illustrate curvatures of generatrices of the first embodiment of the present invention.
Figure 7A:
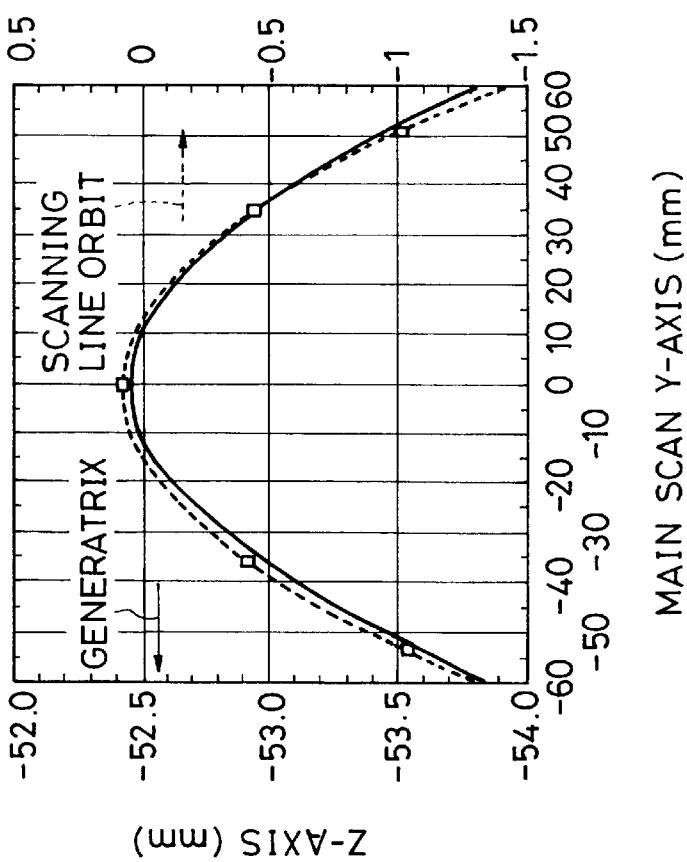
Figure 8:
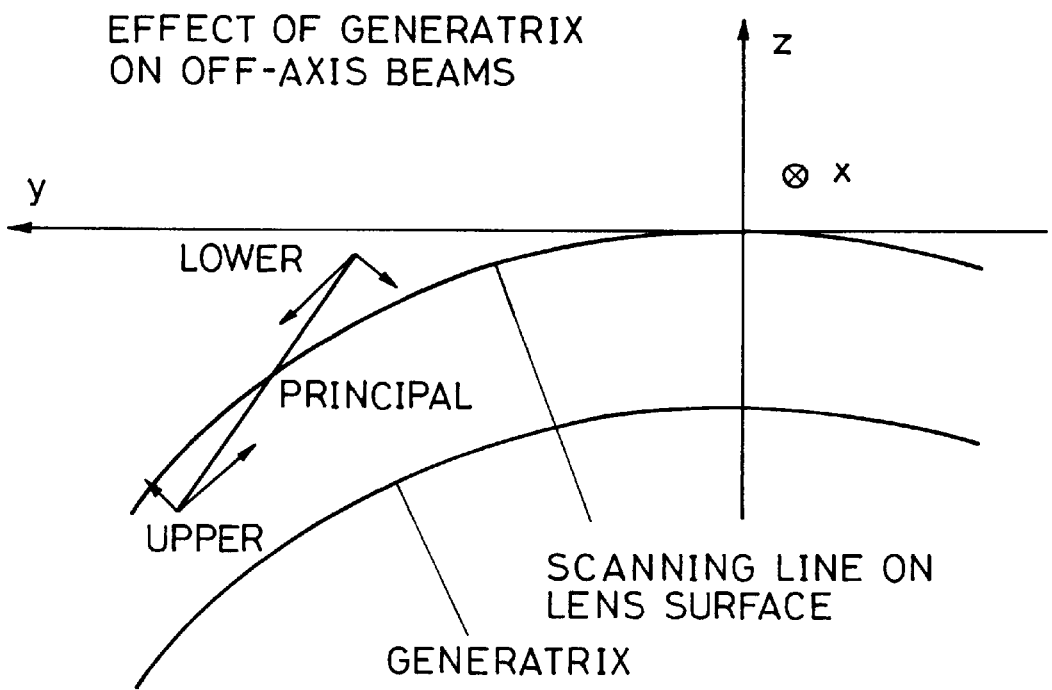
FIG. 8 illustrates the principle of image quality improvement.

In the drawing of the two-stacked toric lenses 4, the lens configuration of the lower toric lens 4a is now considered in view of an axis of symmetry X. The generatrix of the first lens surface of the toric lens 4a looking at the polygon mirror 1 and the generatrix of the second lens surface of the toric lens 4a looking at the side of the photoconductor drum 10 have curvatures substantially equal to the orbit of the obliquely incident light beams as shown in FIGS. 7A and 7B. More particularly, in this embodiment, the generatrices that connect the vertices of the radius curvature on a lens surface in the sub scanning direction of the toric lens 4a are curved in the sub scan direction. The sub scan direction of the toric lens 4a is perpendicular to the main scan plane in which the optical axis lies. The curvature of the generatrix prevents the rotation of the light beam introduced with an angle of view in the main scan plane, presenting a good image quality. FIG. 8 how image quality is improved by the curvature of the generatrix.

As shown, by curving the generatrix of the toric lens 4a along with the scanning line in the sub scan direction, the light beams U, L on both sides of the principal beam P having the angle of view in the main scan direction are subject to a refracting power which forces both light beams U, L toward the principal light beam P if viewed in the Y-Z plane. As a result, the light beams U, L do not rotate about the principal light beam P, and a good image quality is achieved.

In this embodiment, the curvature of the scanning line at the maximum angle of view is approximately 1.09 mm on the first lens surface, and 1.87 mm on the second lens surface. The corresponding curvatures of the generatrices are 1.16 mm and 1.62 mm, respectively, and thus approximately match the scanning line curvatures.

Furthermore, in this embodiment, the generatrices of the first and second lens surfaces of the toric lens 4a are respectively shifted downward in the sub scan direction by predetermined distances from the optical axis of the toric lens 4a (FIG. 6B). In FIGS. 7A and 7B, the left-hand ordinates represent the absolute values of the shifts from the optical axis of the generatrices. The shift is approximately 52.4 mm on the first lens surface and approximately 2.1 mm on the second lens surface. The effect of the generatrix shifting advantageously corrects the scanning line curvature, arising from the obliquely incident light beams, on the photoconductor drum in this embodiment.

Figure 9:
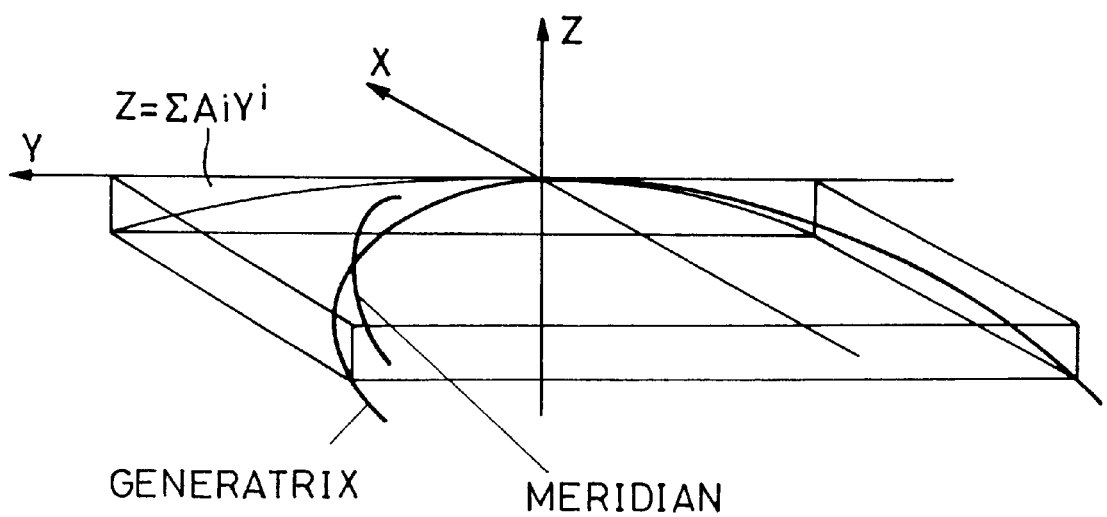
FIG. 9 is an explanatory view illustrating the definition of a toric surface having a curved generatrix.

FIG. 9 is a diagrammatic view of the lens surface of a toric lens having a curved generatrix. The curved gneratrix of the lens surface if viewed in the X-Y plane is expressed by the following equations.

$$X = \frac{Y^2/R_u}{1+\sqrt{1-(1+K_{yu})(Y/R_u)^2}} +$$
$$B_{4u}Y^4 + B_{6u}Y^6 + B_{8u}Y^8 + B_{10u}Y^{10} \quad (Y \geq 0)$$

$$X = \frac{Y^2/R_l}{1+\sqrt{1-(1+K_{yl})(Y/R_l)^2}} +$$
$$B_{4l}Y^4 + B_{6l}Y^6 + B_{8l}Y^8 + B_{10l}Y^{10} \quad (Y < 0)$$

As shown, the optical axis of the lens is the x-axis, and the main scan direction is aligned with the y-axis. The generatrix is a curve that connects the vertices of the radius curvature on a lens surface in the sub scanning direction of the toric lens, and the z-axis component of the generatrix is a polynomial of y coordinate as follows:

$$Z=\Sigma AiY^i (i=0, 1, 2, \ldots, 8)$$

In this embodiment, the polynomial includes up to an eighth term. This polynomial expresses curvatures curved in the sub scan direction and projected onto the y-z plane, and corresponds to FIGS. 7A and 7B.

Figure 10:
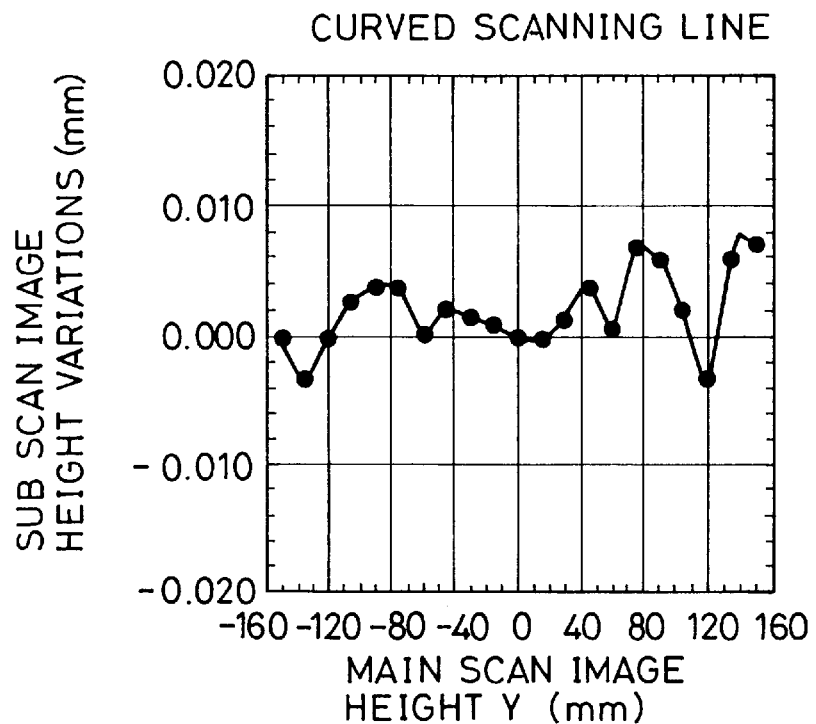
FIG. 10 is a graph showing the curvature of a scanning line obtained in the first embodiment of the present invention.

FIG. 10 shows the scanning line curvature on the photoconductor drum surface in this embodiment. As shown, the magnitude of the scanning line curvature is controlled to 10 µm or smaller within an effective scan area of ±150 mm, and translates to a quarter of one pixel or smaller on a scanning line density of 600 dpi (a resolution of 42.3 µm). This is considered an excellent optical performance.

Figure 11:
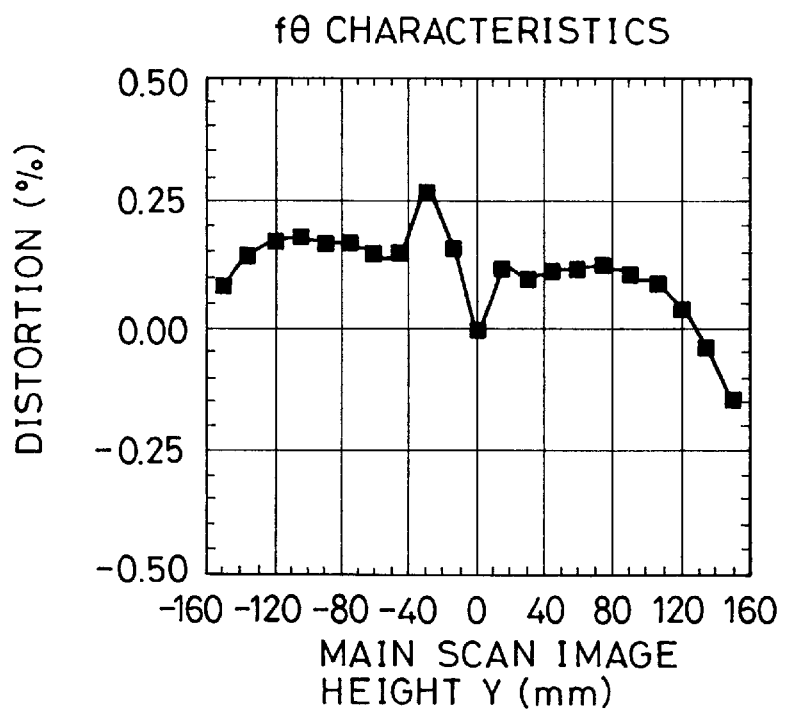
FIG. 11 is a graph showing fθ characteristics obtained in the first embodiment of the present invention.

One of the important optical characteristics of this type of optical scanning device is fθ characteristics. FIG. 11 shows the fθ characteristics of the fθ lenses of two-element system according to the first embodiment of the present invention. As shown, the fθ characteristics remain within an error range of about 0.25% within the effective scan area of ±150 mm. Even with the toric lens of this embodiment having the curved generatrix employed, a sufficient optical performance is still assured.

Figure 12:
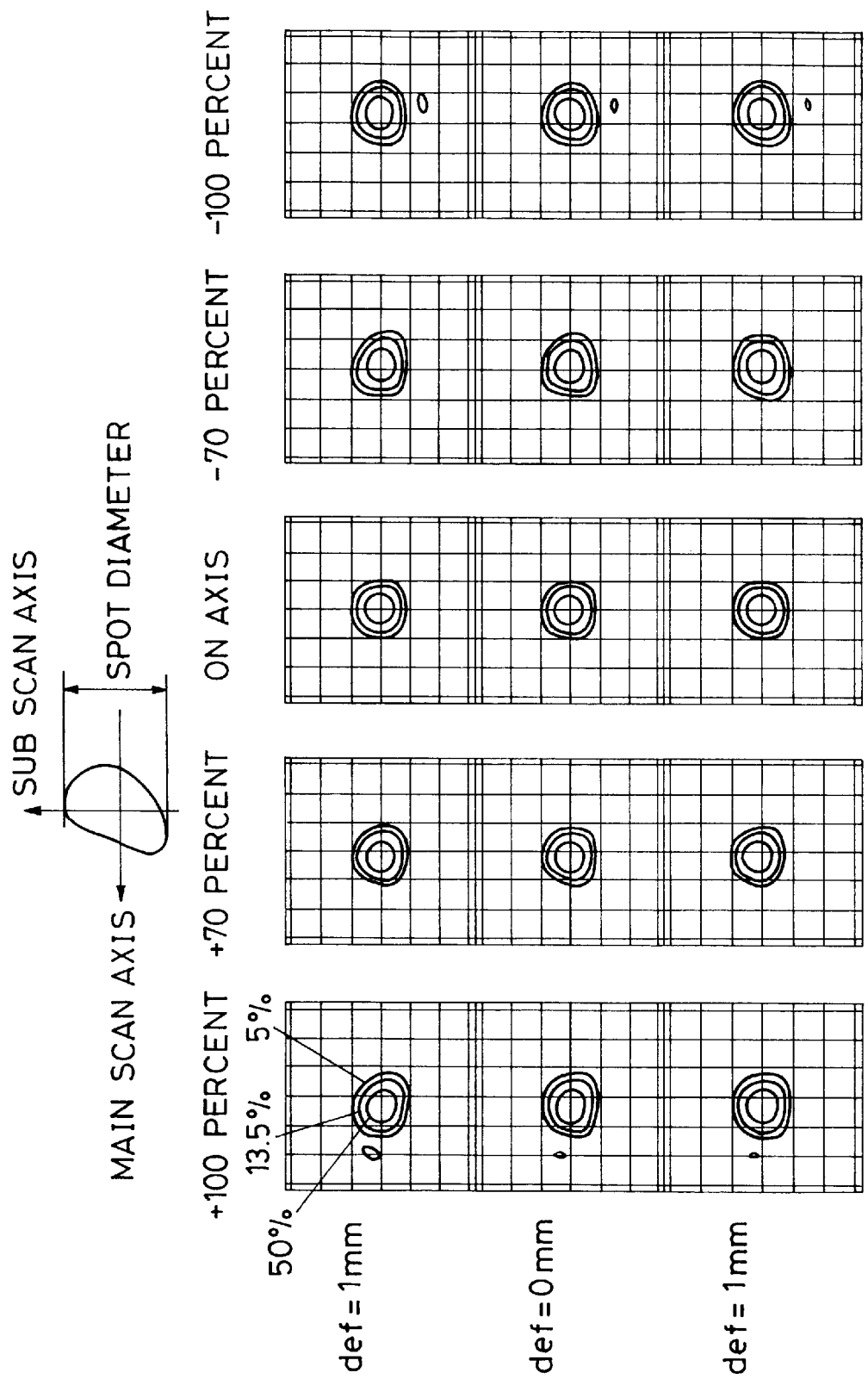
FIG. 12 shows spot images obtained in the first embodiment of the present invention.

FIG. 12 is an explanatory view showing the shapes of three spot images on the photoconductor drum having strengths of 50%, 13.5%, and 5% relative to a peak strength available. As shown, an excellent image quality is obtained at image positions of ±100 percent, ±70 percent, and 0 percent (right on the main scan axis) in the main scan direction, thus virtually over the entire scan area. The diameter of the spot of the 13.5% strength on axis is 58 µm in the main scan direction and 64 µm in the sub scan direction with defocus=0 mm. This is a sufficiently minute spot.

Since in this embodiment, the angles of incidence of the plurality of light beams obliquely introduced to the deflection surface 1a of the polygon mirror 1 are set to be symmetrical to the deflection surface 1a of the polygon mirror 1 as the optical deflector, the generatrix curvatures of the upper and lower toric lenses 4a, 4b in the two-stacked toric lenses 4 are bilaterally symmetrical about the axis of symmetry. More particularly, once one of the two toric lenses is designed, the other is automatically determined because of its bilateral symmetry nature. This not only helps simplify the design steps of the lenses, but equalizes the performances of both toric lenses.

In this embodiment, one of two bundles of light beams (incident light rays) within the sub scan plane may be obliquely introduced while the other bundle of light beams may be normally incident on the deflection surface. Since in this case, a standard toric lens is employed for the other bundle of light beams, designing only one toric lens for the obliquely indent light beams is sufficient. To curve the generatrix, there is no choice but to use a plastic material, of which the toric lens is molded. Plastic materials are not so reliable as glass material. Thus, one toric lens corresponding to the other bundle of light beams may be constructed of an ordinary glass material to assure the reliability of the device.

In this embodiment, a plurality of light beams are used to perform multi-beam scanning. Alternatively, a single bundle of light beam may be introduced to the deflection surface of the optical deflector at an oblique angle in the sub scan plane, and a rotationally asymmetrical lens (a toric lens) constituting an fθ lens as image forming means may be formed to have a lens configuration as already described. The present invention is also applied in this case in the same way as in the preceding embodiment.

FIGS. 13A and 13B are sectional views illustrating a major portion of an optical scanning device, including an optical deflector and its succeeding stages, according to a second embodiment of the present invention. FIG. 13A is the main scan longitudinal sectional view and FIG. 13B is the sub scan longitudinal sectional view. In these figures, components identical to those described with reference to FIGS. 6A and 6B are designated with the same reference numerals.

The second embodiment is different from the first embodiment in that two-stacked ordinary toric lenses 24 shown in FIG. 1, free from generatrix curvature, are used with the optical axes of upper and lower toric lenses 24a, 24b tilted to obliquely incident light beams by predetermined angles in the sub scan plane. The rest of the construction and optical function remains unchanged from that of the first embodiment. The second embodiment presents the same advantage as the first embodiment.

As shown in FIG. 13B, the two ordinary toric lenses 24 stacked as shown in FIG. 1 are used. The image quality degradation is substantially improved by tilting the optical axes (represented by dotted lines) of the upper and lower toric lenses 24a, 24b constituting the two-stacked toric lenses 24 relative to the obliquely incident light rays (light beams) by a predetermined angle of α in the sub scan plane. If viewed from the side of the obliquely incident light beams, the generatrix of the second lens surface of the toric lens 24a (24b) appears to be curved in the sub scan direction by the tilt angle of α. This arrangement presents the effect corresponding to the curvature of the generatrix of the second lens surface of each of the toric lenses 24a, 24b in the sub scan direction. For example, the image quality will be substantially improved if the toric lenses are tilted by an angle of α=6.5° against an oblique angle of incidence of θ=3°.

Since the magnitude of the generatrix curvature using this method greatly depends on the configuration of the generatrix in a plane in which the optical axis of the lens lies and the tilt angle of α of the lens, design flexibility in the second embodiment is not so large as in the first embodiment. However, the use of simple toric lenses of a conventional glass material as in this embodiment still present substantial improvements in image quality.

Figure 14:
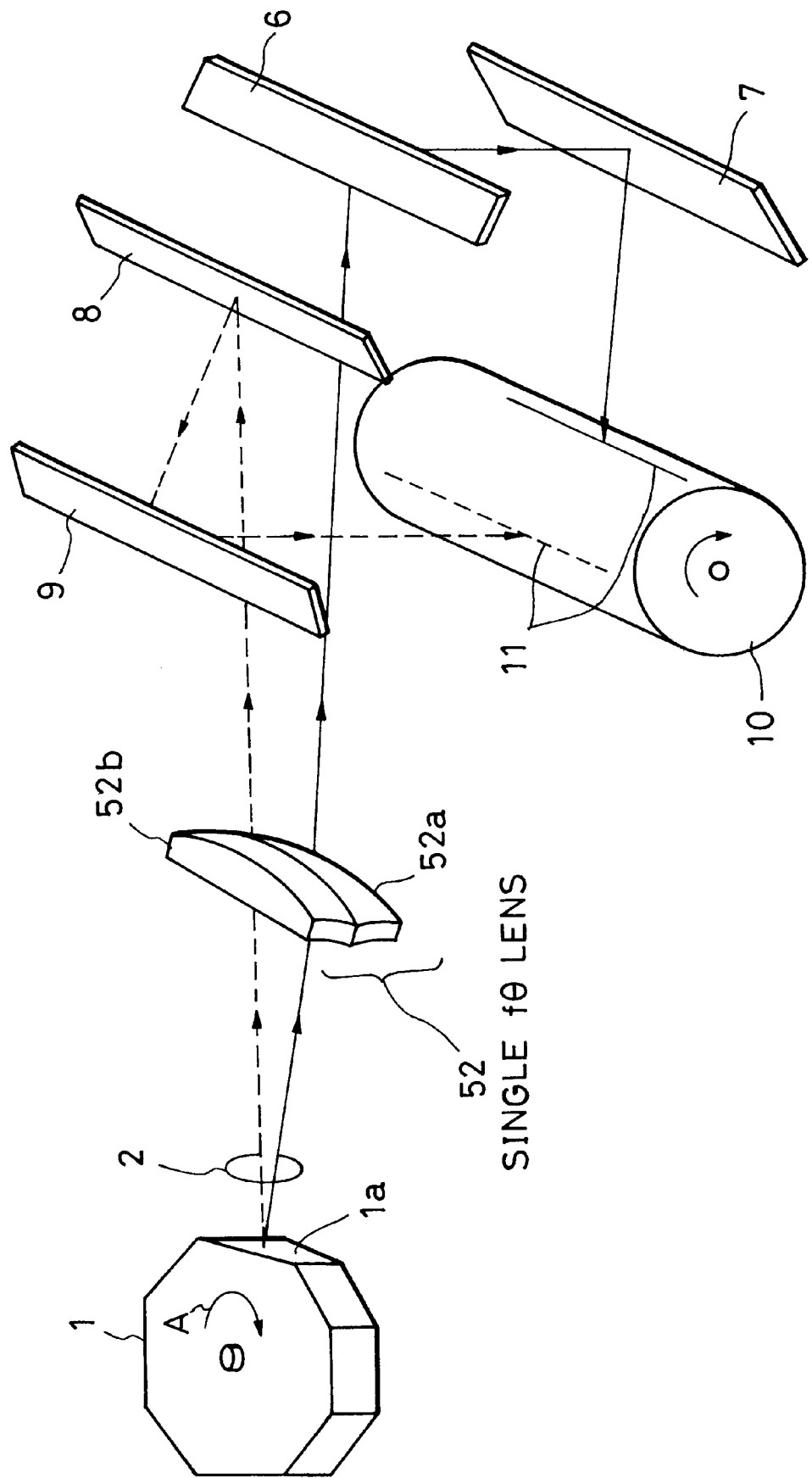
FIG. 14 is a perspective view illustrating a third embodiment of the present invention.

FIG. 14 is a perspective view illustrating a major portion of an optical scanning device, including an optical deflector and its succeeding stages, according to a third embodiment of the present invention. FIGS. 15A and 15B are a main scan longitudinal sectional view and a sub scan longitudinal sectional view of the major portion, including the optical deflector and its succeeding stages, in the third embodiment of the present invention. In FIGS. 14, 15A, and 15B, components identical to those described with reference to FIGS. 5A–5C and 6A–6B are designated with the same reference numerals.

The third embodiment differs from the first embodiment in that an fθ lens as image forming means is constituted by a single element lens (a single-element fθ lens). The rest of the construction and optical function remains unchanged from that of the first embodiment. The third embodiment presents the same advantage as the first embodiment.

Single-element fθ lenses 52 include upper and lower lenses (rotationally asymmetrical lenses) 52a, 52b in the sub scan plane as shown in FIG. 15B. The two lenses 52a, 52b correspond respective obliquely incident beams.

In this embodiment, the generatrices of the two lenses 52a, 52b constituting the single-element fθ lenses 52 are curved in the sub scan direction to be in alignment with the scanning line, thus the orbit of the incident beam, in the same manner as the second lenses (two-stacked toric lenses) of the two-element fθ lens system in the above-described first embodiment. The image quality is thus improved based on the principle of controlling the rotation of the beams illustrated in FIG. 8.

The single-element fθ lens system in this embodiment has disadvantageously a wider lens backward space than the two-element fθ lens system and is subject to less flexibility in the arrangement of the mirror. However, the single-element fθ lens system reduces the component count and cost of the device.

Referring to FIGS. 16A and 16B, the optical layout of the optical scanning device of the present invention shown in FIG. 5 is discussed.

As shown, a XYZ coordinate system is now considered. The origin of the plane of each optical element (represented by •) is expressed relative to the origin (0,0,0) at the center of rotation of the polygon mirror.

Assuming the case that light beams herein are reflected and deflected in parallel with the X-Z plane by the polygon mirror 1, the coordinates of the toric lens 4a only are shown below because the toric lenses 4 are bilaterally symmetrical about the X-Y plane. The polygon mirror 1 is an octagon mirror of 65 mm diameter.

| Coordinates of the origins of the surfaces | | | |
|---|---|---|---|
| unit: | X coordinate (mm) | Y coordinate (mm) | Z coordinate (mm) |
| Center of rotation of polygon mirror 1 | 0 | 0 | 0 |
| Deflection surface 1a | 33.07 | −16.49 | 0 |
| Plane of incidence of cylindrical lens 3 | 63.35 | −15.88 | 0 |
| Plane of exit of cylindrical lens 3 | 86.97 | −15.88 | 0 |
| Plane of incidence of toric lens 4a | 139.67 | −15.88 | −10.24 |
| Plane of exit of toric lens 4a | 148.99 | −15.88 | −11.22 |
| Surface of photoconductor drum 10 (image plane) | 450.33 | −15.88 | −42.89 |

Direction cosines of the direction normal to the above planes are listed below.

| Direction cosines of the planes (X components) | | | |
|---|---|---|---|
| | gx(x) | gx(y) | gx(z) |
| Deflection surface 1a | 0.89493 | −0.44620 | 0 |
| Plane of incidence of cylindrical lens 3 | 1.00000 | 0 | 0 |
| Plane of exit of cylindrical lens 3 | 1.00000 | 0 | 0 |
| Plane of incidence of toric lens 4a | 0.99452 | 0 | −0.10453 |
| Plane of exit of toric lens 4a | 0.99452 | 0 | −0.10453 |
| Surface of photoconductor drum 10 (image plane) | 0.99452 | 0 | −0.10453 |

| Direction cosines of the planes (Y components) | | | |
|---|---|---|---|
| | gy(x) | gy(y) | gy(z) |
| Deflection surface 1a | 0 | 1.00000 | 0 |
| Plane of incidence of cylindrical lens 3 | 0 | 1.00000 | 0 |
| Plane of exit of cylindrical lens 3 | 0 | 1.00000 | 0 |
| Plane of incidence of toric lens 4a | 0 | 1.00000 | 0 |
| Plane of exit of toric lens 4a | 0 | 1.00000 | 0 |
| Surface of photoconductor drum 10 (image plane) | 0 | 1.00000 | 0 |

| Cylindrical lens 3 | |
|---|---|
| Curvature of radius of the plane of incidence in the X-Y plane | −65.84 |
| Curvature of radius of the plane of exit in the X-Y plane | −72.13 |
| Curvature of radius of the plane of incidence in the X-Z plane | 0 |
| Curvature of radius of the plane of exit in the X-Z plane | 0 |
| Refractive index at a wavelength of $\lambda = 675$ nm | 1.619 |
| Thickness on axis | 23.62 |
| Toric lens 4a | |
| Refractive index at a wavelength of $\lambda = 675$ nm | 1.527 |
| Thickness on axis | 9.38 |

The configuration of the toric lens 4a is determined in the coordinate system shown in FIG. 9, and listed as below.

| Plane of incidence of toric lens 4a | | |
|---|---|---|
| ($Y \geq 0$) | $R_u$ | $0.00000 \times 10^0$ |
| | $K_{yu}$ | $0.00000 \times 10^0$ |
| | $B_{4u}$ | $0.00000 \times 10^0$ |
| | $B_{6u}$ | $0.00000 \times 10^0$ |
| | $B_{8u}$ | $0.00000 \times 10^0$ |
| | $B_{10u}$ | $0.00000 \times 10^0$ |
| ($Y < 0$) | $R_l$ | $0.00000 \times 10^0$ |
| | $K_{yl}$ | $0.00000 \times 10^0$ |
| | $B_{4l}$ | $0.00000 \times 10^0$ |
| | $B_{6l}$ | $0.00000 \times 10^0$ |
| | $B_{8l}$ | $0.00000 \times 10^0$ |
| | $B_{10l}$ | $0.00000 \times 10^0$ |
| (Z) | $A_0$ | $-5.24371 \times 10^1$ |
| | $A_1$ | $-8.22716 \times 10^{-5}$ |
| | $A_2$ | $-4.35411 \times 10^{-4}$ |
| | $A_3$ | $2.41485 \times 10^{-7}$ |
| | $A_4$ | $9.27963 \times 10^{-9}$ |
| | $A_5$ | $-3.83684 \times 10^{-11}$ |
| | $A_6$ | $1.36309 \times 10^{-12}$ |
| | $A_7$ | $1.07112 \times 10^{-17}$ |
| | $A_8$ | $3.49275 \times 10^{-23}$ |
| Plane of exit of toric lens 4a | | |
| ($Y \geq 0$) | $R_u$ | $-1.79366 \times 10^2$ |
| | $K_{yu}$ | $3.29536 \times 10^{-1}$ |
| | $B_{4u}$ | $-1.03513 \times 10^{-8}$ |
| | $B_{6u}$ | $-4.64076 \times 10^{-13}$ |
| | $B_{8u}$ | $1.42729 \times 10^{-16}$ |
| | $B_{10u}$ | $1.57191 \times 10^{-20}$ |
| ($Y < 0$) | $R_l$ | $-1.79366 \times 10^2$ |
| | $K_{yl}$ | $1.45075 \times 10^{-1}$ |
| | $B_{4l}$ | $-1.07810 \times 10^{-8}$ |
| | $B_{6l}$ | $1.19697 \times 10^{-12}$ |
| | $B_{8l}$ | $-8.93782 \times 10^{-17}$ |
| | $B_{10l}$ | $1.22695 \times 10^{-20}$ |
| (Z) | $A_0$ | $-2.10019 \times 10^0$ |
| | $A_1$ | $-4.86900 \times 10^{-4}$ |
| | $A_2$ | $-5.22798 \times 10^{-4}$ |
| | $A_3$ | $-2.95750 \times 10^{-7}$ |
| | $A_4$ | $-9.24222 \times 10^{-9}$ |
| | $A_5$ | $8.75580 \times 10^{-13}$ |
| | $A_6$ | $3.70351 \times 10^{-13}$ |
| | $A_7$ | $-2.61817 \times 10^{-15}$ |
| | $A_8$ | $1.03539 \times 10^{-16}$ |

According to the present invention, by imparting the generatrix curvature that matches the scanning line curvature of the incident beam, to the lens configuration of the rotationally asymmetrical lens constituting the image forming means (fθ lenses), the problem associated with the oblique entrance optical scanning system, namely, the degradation of image quality, is resolved. Despite its compact size, the magnifying optical scanning device spatially separates the plurality of obliquely incident light beams. The plurality of light beams are converged at nearly the same location, namely the point of deflection, in the sub scan plane on the deflection surface of the optical deflector. With this arrangement, thin structure and light weight design are implemented in the device. The light weight design, in turn, permits the optical scanning device to rotate faster.

According to the present invention, by introducing the obliquely incident light beams at substantially symmetrical angles about the normal direction to the deflection surface, the generatrix curvatures of the toric lenses as the rotationally asymmetrical lenses are permitted to be bilaterally symmetrical about the axis of symmetry. Thus, the optical scanning device presents the toric lenses simple to design.

According to the present invention, by tilting the optical axes of the ordinary toric lenses relative to the obliquely incident light beams by predetermined angles in the sub scan plane, the optical scanning device presents an excellent image quality.

According to the present invention, by shifting the generatrices of at least either of lens surfaces of the toric lens in the sub scan direction by a predetermined distance relative to the optical axes of the lenses, the optical scanning substantially corrects the scanning line curvature.

What is claimed is:

1. An optical scanning device comprising:
   light source means having a plurality of light emission sections;
   deflection means for deflecting a plurality of light beams emitted by the light source means, wherein said plurality of light beams deflected by said deflection means are non-parallel;
   optical means for guiding the plurality of light beams emitted by the light source to the deflection means; and
   image forming means for guiding the plurality of light beams deflected by the deflection means to a surface being scanned, the image forming means comprising a plurality of rotationally asymmetrical lenses, each of which is associated with a respective one of said plurality of light beams, wherein the optical axis of the plurality of rotationally asymmetrical lenses are substantially parallel with the light beams incident on the respective lenses, and each of the generatrices that connect the vertices of the radius curvature on a lens surface in the sub-scanning direction of the plurality of rotationally asymmetrical lenses is curved in the direction of a sub-scan.

2. An optical scanning device according to claim 1, wherein the optical means directs the plurality of beams emitted by the light source means to the deflection surface of the deflection means in non-parallel fashion.

3. An optical scanning device according to claim 2, wherein the plurality of light beams are directed to the deflection surface of the deflection means at angles substantially symmetrical about the optical axis of the optical means in the sub scan plane.

4. An optical scanning device according to claim 1, wherein the optical means directs the plurality of beams emitted by the light source means to the deflection surface of the deflection means at oblique angles in the sub scan plane.

5. An optical scanning device according to claim 1, wherein the deflection surface of the deflection means is optically conjugate to the surface being scanned with respect to the image forming means in the sub scan plane.

6. An optical scanning device according to claim 1, wherein the generatrices of the plurality of rotationally asymmetrical lenses are bilaterally symmetrical about an axis of symmetry.

7. An optical scanning device according to claim 1, wherein the generatrices of at least either of lens surfaces of each of the plurality of rotationally asymmetrical lenses are shifted in the sub scan direction relative to the axes of the respective lenses.

8. An optical scanning device according to claim 1, wherein the optical means further comprises a cylindrical lens.

9. An optical scanning device according to claim 1, wherein said optical scanning device is used for a laser beam printer.

* * * * *